Patented Dec. 23, 1924.

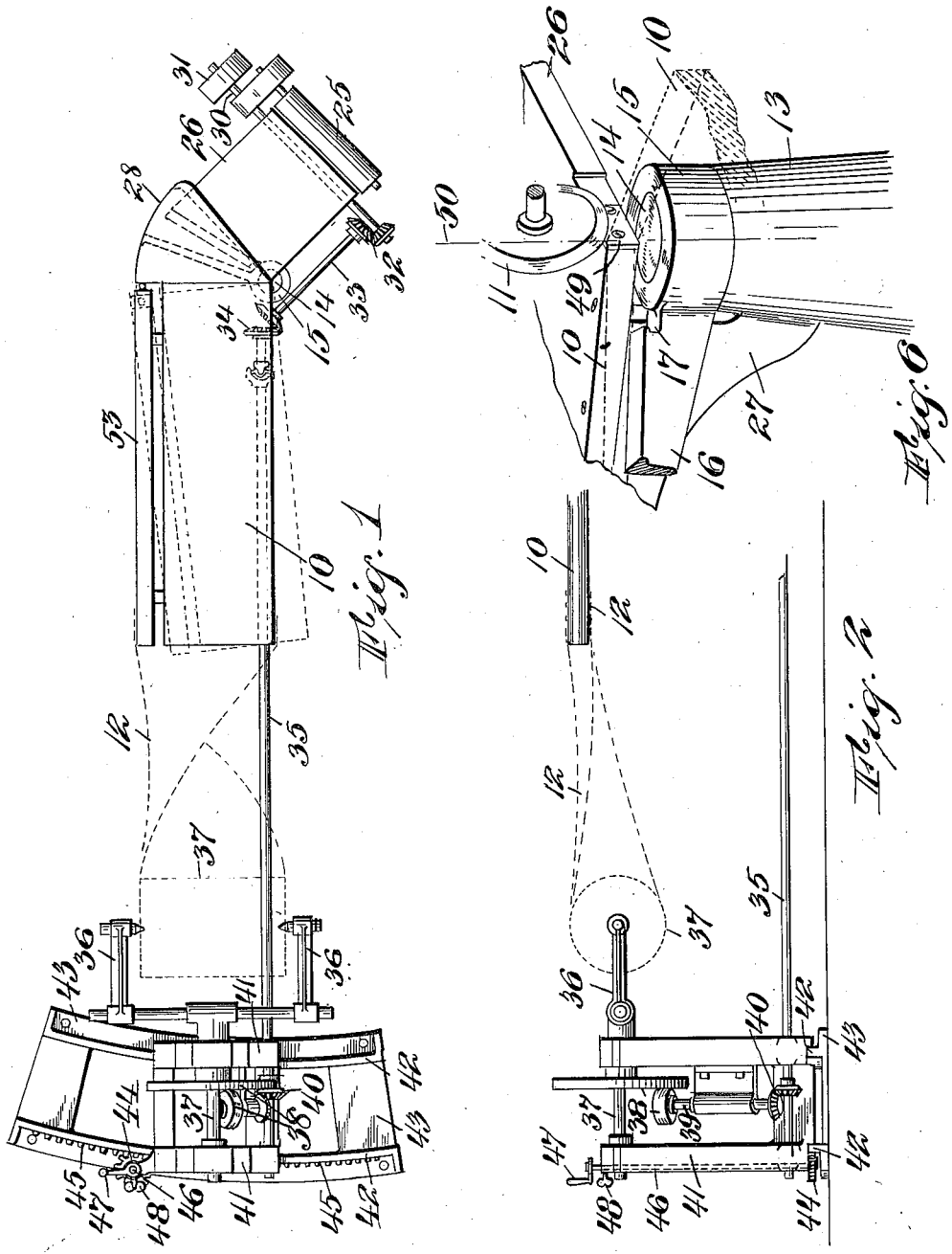

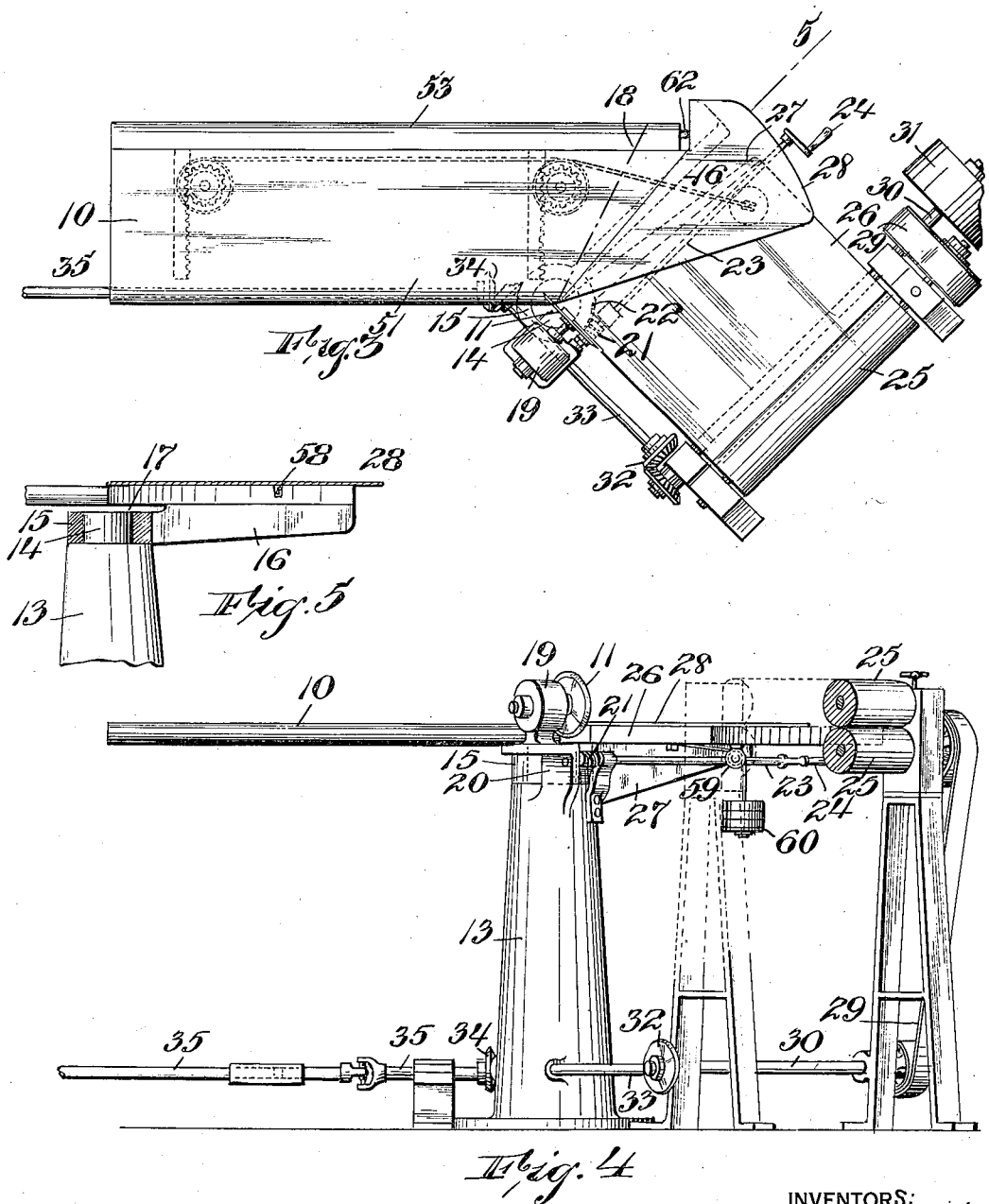

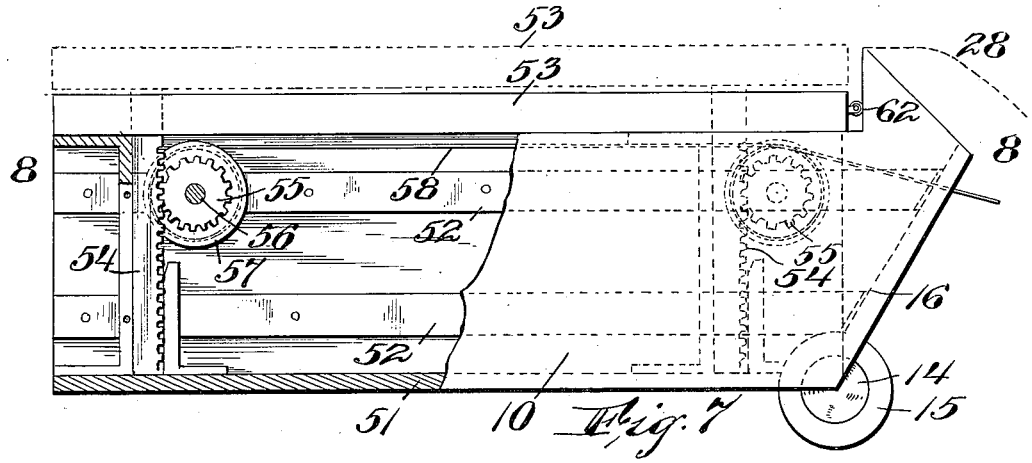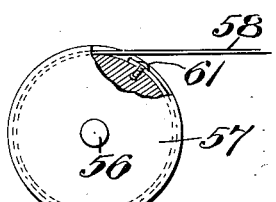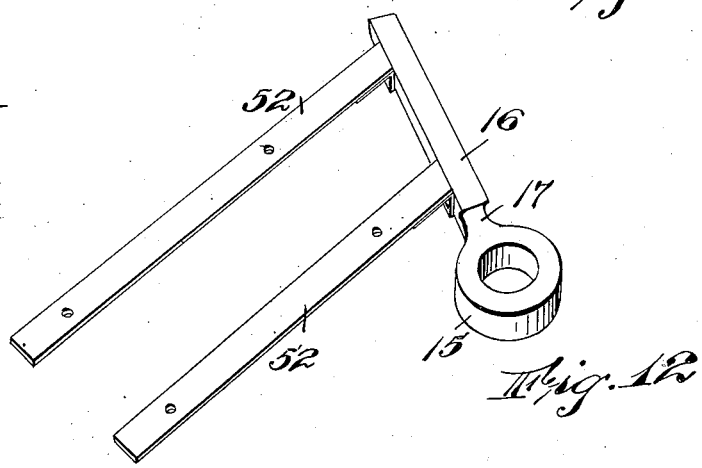

1,520,139

UNITED STATES PATENT OFFICE.

WALTER PRIOR, OF EAST ORANGE, AND WALTER PRIOR, JR., OF SOUTH ORANGE, NEW JERSEY.

MACHINE FOR CUTTING BIAS STRIPS.

Application filed September 29, 1923. Serial No. 665,523.

*To all whom it may concern:*

Be it known that we, WALTER PRIOR and WALTER PRIOR, Jr., citizens of the United States, and residents of East Orange, county of Essex, and State of New Jersey, and South Orange, county of Essex, and State of New Jersey, respectively, have invented certain new and useful Improvements in Machines for Cutting Bias Strips, of which the following is a specification.

This invention relates to an improved machine for cutting bias strips in which the same mandrel can be used for cuts at various angles so that the machine can be adapted to cutting a strip in which the weave is at an angle of 45 degrees to the edge of the strip or at an angle within reasonable limits above or below this normal weave.

In some industries the strip is desired with the strands in the strip, say, at 40 or 50 degrees to the longitudinal direction and this change can be made in this machine without changing the table.

This machine is an improvement over our prior machine patented October 17, 1922, No. 1,432,207, in which machine it was necessary to install a different mandrel with its angular arrangement for each different angle of cut. The present machine can be adjusted quickly without any different installation of mandrel.

The invention is further designed to make it possible to cut different widths of strip by simply adjusting the mandrel relative to the knife. Another object of the invention is to provide a mandrel which will not only receive sleeves of various diameters but to hold any of these strips taut on the mandrel with an even pressure whether the sleeve be large or small as the expandable tension on the mandrel is constant and even.

We show in the accompanying drawings, one embodiment of our machine in which drawings Figure 1 is a plan view of the machine and Figure 2 is a side view of one end thereof. Figure 3 is a top view of the mandrel and its associated parts on a slightly larger scale and Figure 4 is a side view of Figure 3. Figure 5 is a detail section of the mandrel and its support taken on line 5 in Figure 3. Figure 6 is a detail view to illustrate the preferred relative positions of the knife and support of the mandrel. Figure 7 is a detail top view of the improved expansible mandrel, partly in section and Figure 8 is a section on line 8—8 in Figure 7. Figure 9 is an end view of Figure 7 and Figure 10 is a similar view of a modified form. Figure 11 is a detail of a pulley and strand of the expanding mechanism and Figure 12 is a perspective view of the skeleton frame of the mandrel and its hinge.

The mandrel is shown at 10 and the knife at 11, these two elements being the particularly co-operative parts which define by their relation the angle or the cut on the fabric which is fed as a sleeve 12 to the mandrel. As the cloth travels along the sleeve, it is rotated so that the path of any one point on it is spiral or helical and when cut the resultant strip has its weave on the bias. The mandrel is mounted so that it is adjustable relative to the knife and to illustrate this we show a pedestal 13 which has a stud 14 at the top on which is arranged the eye or knuckle 15 of the arm 16. The arm 16 is cut away as at 17 so that that edge of the cut sleeve which passes under the mandrel and emerges at the other side as the other edge of the strip has a smooth and unobstructed path defined roughly by the line 18. The knife 11 is usually a rotary one driven by a small electric motor 19 and supported by a bracket 20 on the pedestal 13. The mandrel 10 can be locked in position by any suitable means but we prefer to move and lock it by a single means as the worm 21 engaging the teeth 22 on the knuckle 15. A shaft 23 and handle 24 provide convenient means for its operation. The cloth after it is cut can pass directly to the take-up rolls 25 but we prefer to install a short table 26 which can be supported by the bracket 27. The gap between the table 26 and the mandrel 10 is bridged by a thin sheet 28 of brass or the like which is secured to the mandrel and slides over the table 26.

There is no means on the mandrel itself for propelling the fabric as the take-up means typified by the take-up rolls 25 pulls on the fabric when and after it is cut and feeding means to be hereinafter described introduces the sleeve to the mandrel. The take-up rolls 25 are shown as driven by the belt 29 from the main shaft 30 which is driven in turn through the pulley 31 from an outside source of power. The main shaft 30 is connected by gears 32 short shaft 33 and gears 34 to the shaft 35 which operates the feeding means.

The feeding means comprises the usual yoke 36 which holds the roll 37 of tubular fabric 12 and the shaft 37 thereof is shown as equipped with a friction drive 38, the shaft 39 of which is driven by gears 40 from the shaft 35. This mechanism is mounted on a frame 41.

The feeding mechanism is preferably mounted so that it can be moved when the angle of the mandrel is varied and this movement is concentric as is the movement of the mandrel to the point where the knife cuts the cloth. We show the frame 41 slidable on tracks 42 of the base 43 and the pinion 44 in mesh with the curved rack 45 is provided with a shaft 46 and a handle 47 for its manipulation. The set screw 48 locks the shaft 46 and therefore the whole feeding means when it has been positioned. The table 26 acts to support a plate or similar element 49 against which the knife 11 cuts and a line as 50 (see Figure 6) defines the centre on which the mandrel is swung when the angle of cut is to be changed.

The mandrel 10 is made so that it will receive and stretch to a flat and taut shape the sleeve of fabric and we show a mandrel formed with an edge portion 51 which is fixed relative to its support. The portion 51 is supported by the arms 52 extending from the arm 16 and co-operates with the movable edge portion 53 which has the racks 54 preferably two, slidable in the part 51 and moved by the pinions 55 on the short shafts 56 on which are fixed the pulleys 57 to which are fastened the strands such as fine wires 58 which pass over the swivelled pulley 59 and have on their ends the weight 60 which tends to rotate the pulleys to force the pinions to push on the racks and thus move the edge portion 53 outwardly. The strands are securely fastened to their respective pulleys as by the screws 61. The roller 62 is installed to make the movement of the movable edge portion easy under the influence of the weight as it takes up the thrust of the slight pressure of the sleeve as it is received at the other end of the mandrel.

The mandrel can have its edge portions provided with rollers 63 as shown in Figure 10 to enable heavier fabric such as canvas to freely pass along the mandrel.

The expansible mandrel exerts the same stretching strain laterally on the sleeve passing over the mandrel whether the tube is large or small and whether heavy or light. The weight 60 can be varied when necessary when extremely heavy or light gauge material is being cut. Whether the part 53 is close to the part 51 or extended materially therefrom the stretching or flattening pressure is the same.

Various modifications can be introduced in the various parts of the machine without departing from the scope of the invention.

We claim:

1. In a machine for cutting bias strips, in combination, a mandrel for supporting a sleeve of fabric, a knife for cutting the sleeve to form a strip, and a mounting for the mandrel the mounting being adapted for various angular adjustments of the mandrel relative to the knife.

2. In a machine for cutting bias strips, in combination, a mandrel for supporting a spirally moving sleeve of fabric; and a knife for cutting said sleeve to form a strip, said mandrel and knife being adjustable relative to each other so as to vary the angle of the cutting.

3. In a machine for cutting bias strips, in combination, a mandrel for supporting a sleeve of fabric, a knife for cutting the sleeve so supported, and a pivot on which the mandrel can swing said pivot having its axis substantially in line with the point of the cutting.

4. In a machine for cutting bias strips, in combination, a mandrel, for supporting a sleeve of fabric, a knife for cutting said sleeve, and means for mounting the mandrel so that it can be adjusted in a plane perpendicular to the plane of the knife, with the point of cutting defining the centre of adjustment.

5. In a machine for cutting bias strips, in combination, a flat mandrel, a pedestal on which the mandrel is adapted to swing, means for securing the mandrel in adjusted positions, and a knife disposed so as to cut material on the mandrel in line with the centre of the swinging movement.

6. A machine for cutting bias strips, comprising a mandrel, means for rotatably feeding a sleeve of fabric to the mandrel and a knife for cutting the sleeve into a strip, the feeding means and the mandrel being adjustable with the cutting point of the knife as a centre.

7. A machine for cutting bias strips comprising a pedestal, a flat mandrel adapted to swing on the pedestal, means for holding the mandrel in adjusted positions, and a knife on the pedestal and adapted to cut material on the mandrel at a point in line with the centre of movement of the mandrel.

8. In a machine for cutting bias strips, a mandrel with a fixed edge portion and a movable edge portion, so as to hold a sleeve of fabric flat and taut, a rack on the movable edge portion, a pinion on the fixed edge portion, and means for yieldingly moving the pinion to project the rack.

9. In a machine for cutting bias strips, a mandrel with a fixed edge portion and a movable edge portion, so as to hold a sleeve of fabric flat and taut, a rack on the movable edge portion, a pinion on the fixed edge portion and a pulley rotatable with the pinion, a weight, and a strand suspending the weight and connected to the pulley.

In testimony that we claim the foregoing, we have hereto set our hands, this 21st day of August, 1923.

WALTER PRIOR.
WALTER PRIOR, JR.